Dec. 5, 1950  C. H. SPARKLIN  2,532,345
SPEED GOVERNOR FOR MOTORS
Filed Feb. 28, 1945  3 Sheets-Sheet 1

Inventor:
Charles H. Sparklin,
By Christen, Wiley & Schroeder,
Merriam & Hoffgren, Attys.

Dec. 5, 1950 — C. H. SPARKLIN — 2,532,345
SPEED GOVERNOR FOR MOTORS
Filed Feb. 28, 1945 — 3 Sheets-Sheet 2
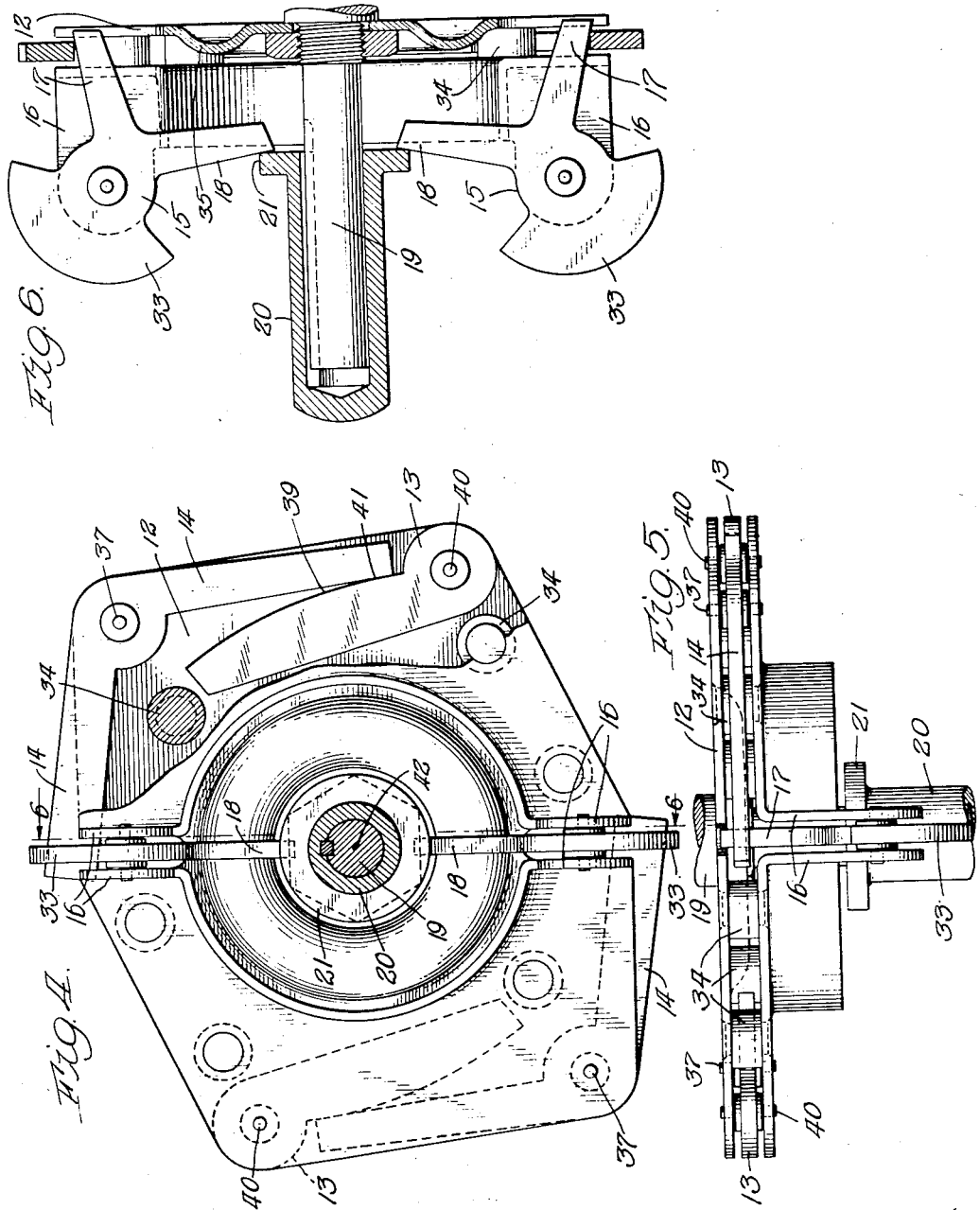
Inventor:
Charles H. Sparklin,
By his Attorneys Dec. 5, 1950     C. H. SPARKLIN     2,532,345
SPEED GOVERNOR FOR MOTORS
Filed Feb. 28, 1945     3 Sheets—Sheet 3
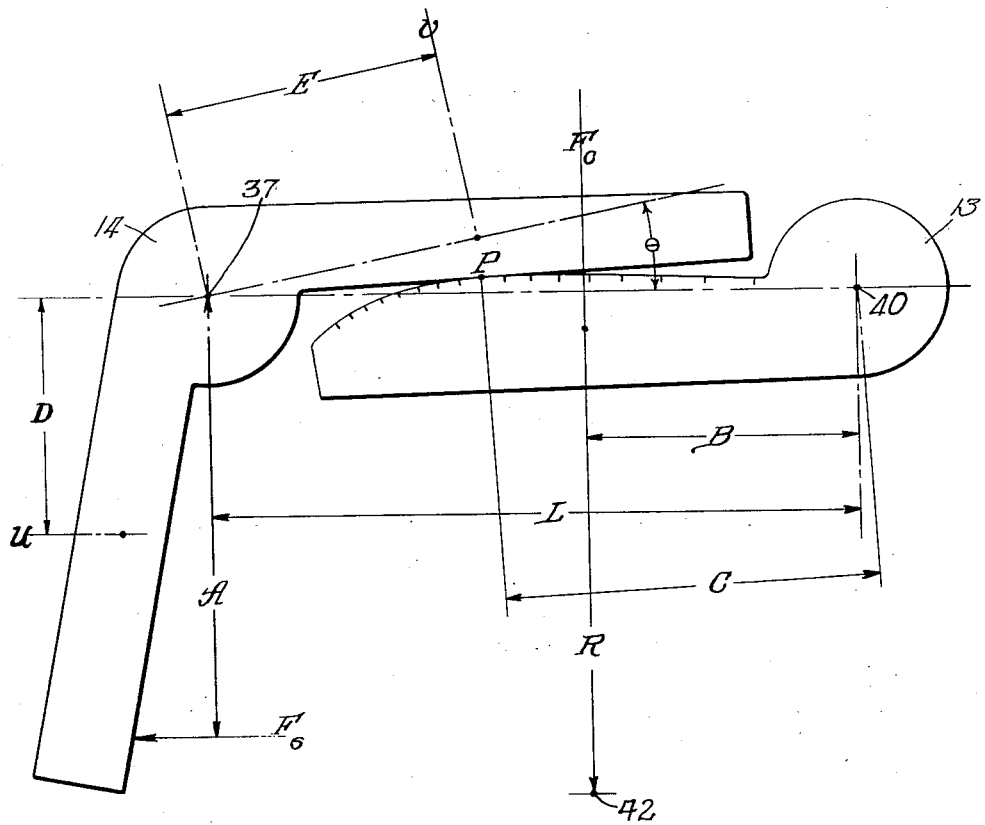
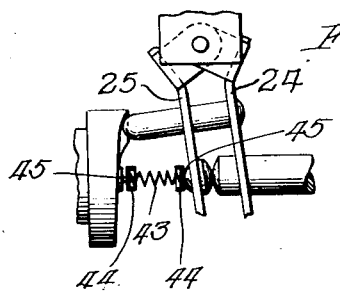
Inventor:
Charles H. Sparklin,
By Stratton, Wiley Schroeder
Merriam & Hofgren, Attys.

Patented Dec. 5, 1950

2,532,345

UNITED STATES PATENT OFFICE 2,532,345

SPEED GOVERNOR FOR MOTORS

Charles H. Sparklin, Chicago, Ill., assignor to Birtman Electric Company, a corporation of Illinois Application February 28, 1945, Serial No. 580,114

29 Claims. (Cl. 200—80)

This invention relates to a speed governor for a motor that is designed to maintain the motor under substantially constant speeds, and relates particularly to such a speed governor in which the speed at which the motor operates is readily adjustable.

In modern electrical work there are found many uses for motors designed to operate at a constant speed. The motors are oftentimes controlled by a speed governor attached to the motor so that when the speed of the motor exceeds a certain value the governor cuts it out of the electrical circuit, and then cuts it back in again when the speed falls below a second value. These two values should be as close together as possible. Many installations require that the governor be variable so that the speed of the motor may be changed by merely changing the settings on the governor.

Prior speed governors of the variable type have been found to be not equally efficient over a fairly wide range of speeds; they are sometimes delicately constructed and do not stand up well in service; they are bulky and are not adaptable to light motors and small space. Probably the most important imperfection in prior variable speed governors is that they are not efficient over a wide range of speed settings as they have different operating characteristics at different speeds. I have invented a variable speed governor that is light in weight, inexpensive, and small, and that is operable with equal efficiency over a very wide range of speeds.

Figure 1:
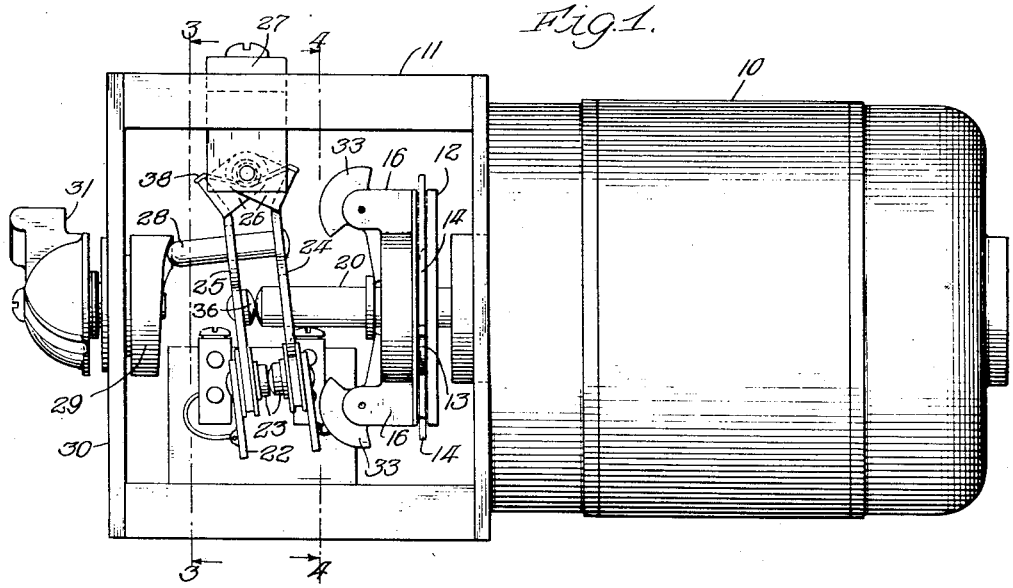
Figures 2, 3:
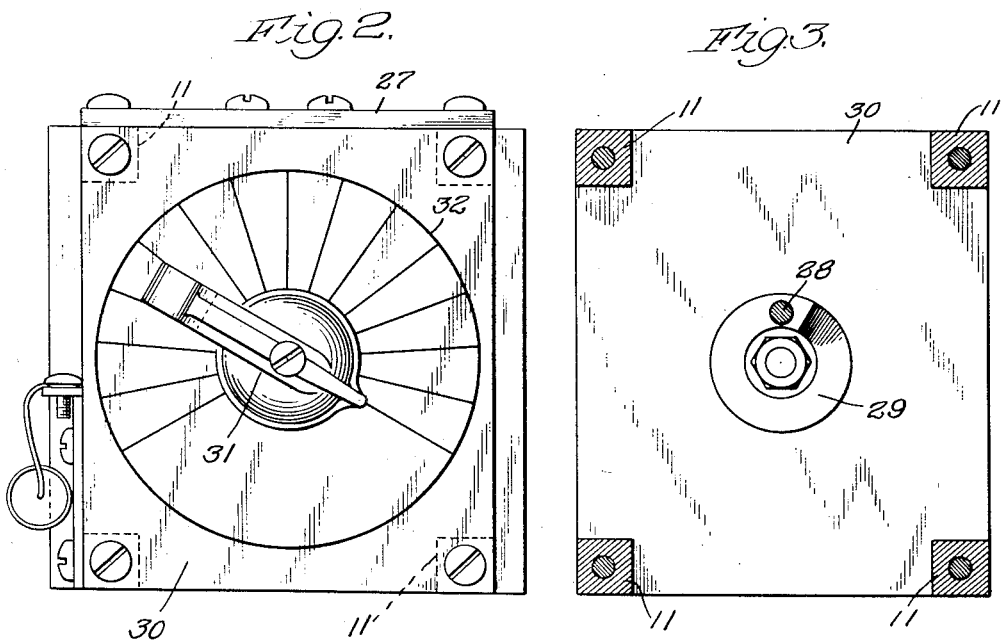

This invention will be described as related to the embodiment shown in the accompanying drawings. Of the drawings, Fig. 1 is an elevation of a motor with the speed governor in place thereon; Fig. 2 is a front elevation of the dial portion of the governor; Fig. 3 is a section taken along line 3—3 of Fig. 1; Fig. 4 is a section taken along line 4—4 of Fig. 1 and partially broken away for clarity of illustration; Fig. 5 is an edge elevation of the structure of Fig. 4; Fig. 6 is a section taken along line 6—6 of Fig. 4; Fig. 7 is a view showing a centrifugally movable arm and contacting bell crank with values expressed for the development of mathematical formulae; Fig. 8 is a fragmentary side elevation showing the position of a variable spring which can be attached to the switch of the governor.

In the embodiment of the invention shown in the drawings, there is provided a motor 10 upon which is mounted a governor located within a frame 11. This governor is positioned around the motor shaft 19 and includes a rotatable plate structure 12 which is fastened to the shaft and is designed to rotate with it. The rotatable plate structure is made in two sections which are substantially parallel to each other and are separated by means of short spacer bars 34. One of these sections or plates has a circular curved portion 35 which is designed to reinforce the entire plate structure and resist undue distortion in the plate structure. Within the rotatable plate structure 12, there are located diametrically opposite force responsive arms 13, each hinged at one end as indicated at 40, so that they can move outwardly under the influence of the centrifugal forces set up when the plate rotates. In contact with these arms 13, there are provided two balanced bell cranks 14 having actuator arms each arranged with one end in contact with one of the hinged arms 13. The other end of each of these bell cranks is located generally within the plate structure 12. In contact with the other end of each of these first bell cranks 14, there is mounted a second bell crank 15 each rotatably mounted between side plates 16 and positioned at right angles to the plane of rotation of the plate structure 12. Each of these two second bell cranks 15 is arranged so that one end contacts the first bell crank, and the other end extends toward and adjacent to the motor shaft 19. Each bell crank 15 is preferably balanced by providing a balancing section 33. On the motor shaft, there is provided a slidable fitting 20 in the form of a cylinder which is keyed to the shaft. This fitting 20 has a flat base 21 which is in contact with the free ends 18 of the second bell cranks 15. The cylindrical fitting 20 extends through a hole provided in one of two parallel switch arms 24 and 25. This switch arm 24, through which the fitting extends, is arranged substantially parallel to a second switch arm 25. These arms are provided with end brackets 26 (Fig. 1) by means of which they are hingedly connected to each other at one end and rotatably mounted to the frame 11 of the governor by means of a clamp 27. The other ends of the switch arms have two electrical contact points 23 through which the electric current to the motor flows. The cylindrical fitting 20, which extends through the first switch arm 24, presses against a bearing piece 36 on the second switch arm 25. Near the hinge 26 of the switch, there is mounted a rod 28 which extends from the first switch arm 24 through a hole provided in the second switch arm 25. This rod bears against a circular inclined plane on a circular cam 29 that is movably mounted on a plate 30 at the front of the governor. At the front of this plate, there is a button 31 which is keyed to the circular inclined plane cam 29. This button has a pointer which operates on a dial 32 and can be turned to any desired position.

In operating the governor of this invention, the button 31 is turned to any desired position on the dial 32. This moves the circular inclined plane cam 29 to a given position and thereby regulates the speed of the motor. When the motor is in operation, the rotatable plate structure 12 rotates at the same speed as the motor. As the speed builds up, the centrifugal force on the hinged arms 13 becomes greater and greater. This force causes the arms to move outwardly against the contacting arms of the first bell crank 14. These bell cranks thereupon turn around their fulcrums 37 and bear against the engaged arms 17 of the second bell cranks 15. By this action, the free ends 18 of the second bell cranks 15 push outwardly against the slidable cylindrical fitting 20. The fitting thereupon pushes against the bearing piece 36 on the second switch arm 25, and when the speed of the motor has attained its predetermined value corresponding to the setting of the switch arms 24 and 25, the force becomes great enough to push the second switch arm 25 outwardly and break the electrical contact in the contact points 23 by separating these points. The first switch arm 24 is held immovable by the rod 28 which rests on the inclined plane of cam 29. With the electrical contact to the motor thus broken, the speed of the motor drops and the centrifugal force in the hinged arms 13 become less. This lowers the outward thrust of the cylindrical fitting 20 and permits the switch 23 to again make contact under the influence of spring 38 acting on the switch arms 24 and 25.

The spring 38 has a constant force that exerts itself at all speed settings of the governor. This constant force spring gives an operating speed ratio of 1 to 5 or 6, which is the ratio between the lowest and highest speeds for the governor. If desired a second spring 43 may be mounted as shown in Fig. 8 to increase the ratio to about 1 to 11, or higher. The second spring is located so that at low speeds it exerts no force but the make and break switch contact 23 is maintained by the first spring 38 only. Then as the speed setting is raised progressively to higher settings the second spring is compressed and exerts greater force. Thus the second spring is variable, exerting a greater force as it is compressed. The second spring should be mounted in end cups 44 that pivot on points 45, one mounted on the movable switch arm 25 and the other mounted on the axial center of the adjusting member or cam 29. This arrangement prevents friction of rubbing against guides and helps keep the spring in alignment. An average variable spring that has been found useful is designed to have a force of 0 pounds at low speed to 0.524 pound at the highest speed. Such a spring may be made with the following dimensions: Five turns of 0.018 inch music wire having a total length of 0.335 inch; or seven turns of 0.02 inch wire for a length of 0.385 inch; or eleven turns of 0.022 inch wire for a length of 0.487 inch; or 15 turns of 0.024 inch wire for a length of 0.605 inch.

As can be noted in the above description of the operation of the governor, the speed at which the governor breaks contact to the motor depends upon the distance which the slidable fitting 20 must be thrust in order to break the electrical contact. This distance may be carefully regulated by positioning the circular inclined plane cam 29. Thus if the inclined plane cam is in the position shown in Fig. 1, the governor operates at a relatively low speed; while if the inclined plane cam is turned in a counterclockwise direction (looking toward the front of the dial 32), the lower section of the inclined plane is brought in contact with the rod 28 and it is therefore necessary for the distance of thrust of the fitting 20 to be considerably greater. This very simple construction provides a sharp control over the speed of rotation of the motor.

In order that the speed governor will operate in a smooth and efficient manner, the edges 39 of the hinged arms 13, which contact the first bell crank, are rounded outwardly in the shape of a section of a parabola as shown in Fig. 7. The movable end of the arm 13 as designed is located perpendicularly above one of the focal points of the parabola and the fixed end of the arm extends back from this. With the force responsive arm 13 constructed as shown in Fig. 7, the points of contact for equal changes in speed are as shown in Fig. 7. As indicated, the distances between these points at lower speeds is large while at higher speeds the distances become very small. This is necessary as at low speeds the distance from the point of contact P (Fig. 7) to the fulcrum 37 of the bell crank is quite large, while at high speeds the distance is small. The changing leverage thus makes it necessary to decrease the distance between points of contact in order that the other end of the bell crank (where $F_s$ is applied) will move equal distances for equal changes in speed. As the movable arm 13 progresses outwardly with increase in speed and thus increase in centrifugal force from the low speed position to the high speed position, its outward movement for equal increments of movement for the contacting portion of the bell crank decreases at a rate equal to the rate that the centrifugal force increases, which is proportional to $N^2R$ where N is the rate of speed and R is the distance from the center of rotation 42 to the center of gravity of the movable arm 13. Therefore the energy change, $\Delta E$, for equal angular increments of the bell crank 14 about its fulcrum is a constant energy value. As expressed mathematically: the energy change is directly proportional to the centrifugal force change ($\Delta K_1 N^2 R$) and inversely proportional to the distance change from center of rotation to the center of gravity of the driver arm 13 ($\Delta K_2 N^2 R$). Thus:

$$\Delta E = \Delta K_1 N^2 R X \frac{1}{\Delta K_2 N^2 R} = \frac{\Delta K_1}{\Delta K_2} = \text{a constant}$$

It is desirable, therefore, that the contacting portion of the movable arm 13 be a section of a parabola with one focus point directly beneath the outer or movable end of the actuator arm 13. The equation for a parabola is $y^2 = 4Px$. Therefore as the arm 13 progresses outwardly with increase in speed (and thus increased centrifugal force) from low to high speeds the contacting arm of the bell crank 14 is moved through equal angles about its fulcrum and the other end of the bell crank 14 is also moved equal distances. This arrangement makes the governor a truly variable one adapted to regulate speed fully as well at one speed as another within the operation range of the governor.

When rotation is first set up in the speed governor the arms 13 and bell cranks 14 are in the position shown in Fig. 4. In the embodiment shown the distance between the pivot of one arm 13 and the pivot of the corresponding bell crank is 1¾ inches. The other distances shown are to scale in the drawings. This provides that at about 2600 R. P. M. the arm 13 begins to move outwardly under centrifugal force, and at about 10,000 R. P. M. the arm has moved as far as it will go, this being the case when only the constant force spring 38 is used to resist opening of the contacts 23. These conditions, can, of course, be changed by using different distances between pivot points and different radii of curvature for the contacting surface of arms 13. In the embodiment shown in Fig. 4 the ratio between distance from arm pivot 40 to point of contact 41 and distance from point of contact 41 to bell crank pivot 37 is ⅕ to 1. Then when the speed has increased to the maximum or about 10,000 R. P. M., this ratio becomes 1 to ⅕. In all operating positions, therefore, the total force operating on bell crank 14 remains substantially constant because as centrifugal force increases the leverage operating on the bell crank decreases correspondingly. This construction results in the product of centrifugal force times leverage remaining substantially constant at all operating speeds.

When both the constant force spring 38 and the variable force spring 43 are used the range will be much greater. In a typical speed governor designed to operate at speeds of from 618 R. P. M. to 6790 R. P. M., or a 1 to 11 ratio, the following conditions prevailed: The force of the constant force spring was 0.219 pound at all speeds while the force of the variable force spring varied between 0 pounds at 618 R. P. M. to 0.524 pound at 6,790 R. P. M. The force on the non-contacting or opposite end of each bell crank 14 ($F_s$) increased from 0.245 pound to 0.832 pound under the increasing centrifugal force set up by the increased speed. However the angular displacement of the arm-contacting portion of each bell crank 14 about its fulcrum was substantially equal over the speed range for all equal speed changes. The angular displacement was 0° at 618 R. P. M. and 16.5° at 6,790 R. P. M. The change in angular displacement for equal speed changes was not completely constant but was very nearly so. When going from 618 R. P. M. to 6,790 R. P. M., the angular change for every 500 R. P. M. increase in speed was substantially 1.336°.

In order to provide maximum efficiency in the speed governor for any size base plate structure 14 it is preferred that the distance from the center of rotation 42 to the hinge 37 of the bell crank be equal to the distance from the center of rotation 42 to the hinge 40 of the arm. It is also preferred that each of these distances be equal to the distance between arm hinge 40 and bell crank hinge 37, so that the center of rotation 42, arm hinge 40 and bell crank hinge 37 define an equilateral triangle.

In order that the force acting on bell crank 14 will steadily increase under increasing speed of revolution the shape of arm 13 is adjusted to bring about a constant product of the lever portion of arm 13 times the lever portion of arm 14. In practice an arc of a circle has been found to serve, but it is preferred that it be a section of a parabola, as described in detail hereinabove. There is, of course, a slight deviation due to the fact that the line of contact is not always directly between the pivot points of the arm 13 and bell crank 14, and this slightly shortens the effective arm length. In general this may be disregarded for practical operation but, if desired, it may be corrected for, particularly over large ranges of speed.

It can be shown mathematically that the centrifugal force on the force responsive arm of the bell crank 14 ($F_c$) has a direct relationship to the force exerted by the non-contacting arm of the bell crank ($F_s$). Referring specifically to Fig. 7, where distances and forces are expressed by letters, and balancing moments around the two fulcrum points 37, 40, the two following equations are developed:

$$F_s A - P(L \cos \theta - C) - VE + UD = 0$$
$$F_c B - PC = 0$$

or $$P = \frac{F_c B}{C}$$

Here $F_s$ is the force exerted by the non-contacting end of the bell crank, A is the distance from where this force is applied to the bell crank fulcrum 37, P is the force at the point of contact 41 of the force responsive arm 13, L is the distance between the two fulcrums, $\theta$ is the angle between the actuator arm of bell crank 14 and the force responsive arm 13, C is the moment distance from P to the force responsive arm fulcrum 40, V is the force exerted by the contacting arm of the bell crank 14 taken at its center of gravity, E is the distance from V to the fulcrum 37 of the bell crank, U is the force exerted by the non-contacting arm of the bell crank 14 taken at its center of gravity, D is the distance from U to the bell crank fulcrum 37, B is the distance from the center of gravity of the actuator arm 13 to its fulcrum 40, and $F_c$ is the centrifugal force exerted at the center of gravity by the actuator arm 13 caused by rotation of the speed governor. With these relationships as set out in the above two equations it develops that $$F_c = \frac{C(F_s A - VE + UD)}{B(L \cos \theta - C)}$$

or if VE and UD are assumed to cancel each other, which they very nearly do $$F_c = \frac{F_s AC}{B(L \cos \theta - C)}$$

$F_c$ also depends upon the speed of rotation so that $$F_c = 0.00034056 \frac{WRN^2}{12}$$

The 0.00034056 is a number obtained by simplifying the equation for centrifugal force, $$\frac{MV^2}{R}$$

where M is mass, V is the velocity, and R is distance of the center of gravity of arm 13 from the center of rotation 42. Therefore, $$N = \sqrt{\frac{12 F_c}{0.00034056 WR}}$$

Where N is revolutions per minute, W is the weight of the unbalanced portion of the actuator arm 13, and R is the distance from the center of rotation 42 to the center of gravity of said arm 13. Although here force $F_c$ is shown to be a power function of N where the power appears to be 2 this is not actually the case, as the distance R changes under increased speed so that it effects the above power function. Therefore, depending upon the values of N and R the power function will vary but will always be greater than 1.

The above mathematical analysis shows that there is a constant relationship between all variables that is independent of the speed of rotation that the speed governor is set for, so long as this speed is within the range, which for one example, as shown above, is 618 to 6,790 R. P. M. When the governor is rotating at one speed all variables both forces and distances, are in a state of equilibrium. When the speed is changed to a new setting this equilibrium is quickly re-established. Thus it can be seen that the new speed governor is a truly variable one operable over a wide range of speeds with a great degree of precision.

The contacting edge of the force responsive arm 13 may be merely an arc of a circle or any similar curve but it is preferably an arc taken from a parabola, as discussed in greater detail hereinabove.

The bell cranks 14 not only serve to translate force from the arms 13 but may also function as vibration dampeners on the rotatable plate structure 12. At high speed vibration could become an important factor affecting efficient operation of the governor, but because of the bell cranks 14 the vibration may be dampened and does not become a serious factor in the operation of the speed governor.

One of the great advantages of the presen form of governor is that a relatively great movement is provided in the contact so that wear thereon or on the parts in contact therewith produces a negligible change in speed regulation. It is readily possible to provide a travel of ⅜" in the contact (that is, in the arm 18), whereas on governors of comparable size now available travel will not ordinarily exceed 3/64".

Having described my invention in considerable detail as exemplified by one embodiment of the same, it is my intention that the invention be not limited by these details, unless otherwise specified, but rather be construed broadly within its spirit and scope as set out in the accompanying claims.

I claim:

1. A speed governor for a motor having a shaft and comprising a rotatable plate attached at right angles to the shaft, a plurality of arms hingedly attached at one end to the plate and lying substantially in the plane of rotation, a plurality of bell cranks mounted on said plate each contacting one of said arms at one end of the bell crank, a plurality of second bell cranks each mounted substantially at right angles to one of the first bell cranks and contacting the other ends of the first bell cranks, and a make and break electrical contact mechanically connected to the other ends of said second bell cranks for breaking electrical contact to the motor when centrifugal forces in said arms exceed a certain predetermined value and making electrical contact when said forces fall below said value.

2. A speed governor for a motor as set out in claim 1 wherein said second bell cranks are mounted with their said other ends extending toward and adjacent to the end of the shaft upon which the rotatable plate is mounted.

3. A speed governor for a motor as set out in claim 1 wherein said second bell cranks are mounted with their said other ends extending toward and adjacent to the end of the shaft upon which the rotatable plate is mounted and there is a slidable cylindrical fitting provided on said end of the shaft with the bottom in contact with the said other ends of the second bell cranks.

4. A speed governor for a motor having a shaft and comprising a rotatable plate attached at right angles to the shaft, a plurality of arms hingedly attached at one end to the plate and lying substantially in the plane of rotation, a plurality of bell cranks mounted on said plate each contacting one of said arms at one end of the bell cranks, a plurality of second bell cranks each mounted substantially at right angles to one of the first bell cranks and contacting the other ends of the first bell cranks with the free ends of the second bell cranks extending toward and adjacent to the shaft, a cylindrical fitting slidably mounted on the shaft with the bottom of the fitting in contact with the said free ends of the second bell cranks, and a make and break electrical switch in contact with the top end of said fitting so constructed and arranged that movement of the fitting away from the plate breaks the electrical contact in the switch and movement toward the plate makes the electrical contact.

5. A speed governor for a motor as set out in claim 4 wherein each of said arms have the surface contacting a first bell crank convexly curved so that there is a sliding rocker action when the arms move outwardly under the influence of centrifugal forces set up by the rotating plate.

6. A speed governor for a motor as set out in claim 4 wherein there is provided means for varying the point at which further movement of the fitting away from the motor breaks the electrical contact in the switch.

7. A speed governor for a motor as set out in claim 4 wherein the electrical switch comprises two substantially parallel switch arms hinged at one end with the electrical contact at the other end and with said cylindrical fitting extending through a hole provided in one of the switch arms and contacting a bearing piece on the other switch arm, said switch being mounted at its hinged end on the framework of the governor.

8. A speed governor for a motor as set out in claim 4 wherein the electrical switch comprises two substantially parallel switch arms hinged at one end with the electrical contact at the other end and with said cylindrical fitting extending through a hole provided in one of the switch arms and contacting a bearing piece on the other switch arm, said switch being mounted at its hinged end on the framework of the governor, and a rod mounted substantially at right angles to the switch arm through which said fitting extends and itself extending through a hole provided in the other switch arm, said rod being in contact with an inclined plane movably mounted on a surface arranged substantially parallel to said rotatable plate.

9. A speed governor for a motor as set out in claim 4 wherein the electrical switch comprises two substantially parallel switch arms hinged at one end with the electrical contact at the other end and with said cylindrical fitting extending through a hole provided in one of the switch arms and contacting a bearing piece on the other switch arm, said switch being mounted at its hinged end on the framework of the governor, and a rod mounted substantially at right angles to the switch arm through which said fitting extends and itself extending through a hole provided in the other switch arm, said rod being normally in contact with an adjustable circular inclined plane mounted on a surface arranged substantially parallel to said rotatable plate with the inclined plane being adjustable around an axis of rotation.

10. In an apparatus comprising a shaft rotated by a power means, a speed governor comprising a member mounted on the shaft and rotatable therewith, a centrifugally responsive arm carried by the member, a lever against which the arm is centrifugally urged upon rotation of the member, means for automatically varying the point of contact of the lever and the arm upon rotation of the member at least one of said arm and said lever being curved to produce a substantially constant predetermined force on the lever at all speeds within a selective range, speed control means, and means for translating the force from the lever to said control means, whereby when the speed tends to increase beyond a predetermined maximum value said control means is actuated to compensate therefor.

11. In a speed governor for a motor having a shaft and comprising a rotatable plate attached at right angles to the shaft, an arm hingedly attached at one end to the plate and lying substantially in the plane of rotation, a bell crank mounted on said plate and contacted by said arm adjacent one end of the bell crank, a second bell crank mounted substantially at right angles to the first bell crank and contacting the other end of the first bell crank, and a make and break electrical contact mechanically connected to the other end of said second bell crank for breaking electrical contact to the motor when centrifugal forces in said arm exceed a certain predetermined value and making electrical contact when said forces fall below said value.

12. In an apparatus comprising a shaft rotated by power means, a speed governor comprising a member mounted on the shaft for rotation therewith, a centrifugally responsive arm rotatably mounted at one end on the member, a lever rotatably mounted at a point adjacent its center on the member, said arm having a convex portion bearing against one end of the lever with said arm being centrifugally urged against the lever upon rotation of the member, at least one of said lever and arm being curved so that the point of contact of the convex portion of the arm upon the lever is varied to produce a substantially constant predetermined force at all speeds within a selective range, speed control means for limiting the speed to a predetermined maximum, and means for translating the force from the lever to said control means, whereby when the speed tends to increase beyond a predetermined maximum value said control means is actuated to compensate therefor.

13. Apparatus as set out in claim 12 wherein the product of leverage in the lever and leverage in the arm is substantially the same at all operating speeds within the selective range.

14. Apparatus as set out in claim 12 wherein the ratio between the distance from the pivot point on said arm to the point of contact and the distance from point of contact to the pivot point on said lever is 1/5 to 1 at initial speed, while the same ratio at final speed is 1 to 1/5.

15. Apparatus as set out in claim 12 wherein said lever is a bell crank mounted on the rotatable member serving the dual purpose of translating force from the centrifugally responsive arm and dampening vibration in said rotatable member.

16. In a speed governor for a power means having a shaft and comprising a plate mounted on the shaft, an arm hingedly attached at one end to the plate and responsive to centrifugal force set up by said rotating plate, a lever contacting said arm arranged to move in the same plane as the arm about a fulcrum when centrifugal force set up by increasing speed of rotation causes said arm to move outwardly, speed control means for limiting the speed of the power means to a predetermined maximum, and means on the other end of said lever for operating said control means when centrifugal forces exceed a certain predetermined value at a selected maximum speed, at least one of said arm and said lever being curved to produce a substantially constant force at all times.

17. Apparatus as set out in claim 12 wherein the distance from the pivot point on said lever to the center of rotation of said rotatable member is substantially equal to the distance from said center of rotation to the pivot point on said arm.

18. Apparatus as set out in claim 12 wherein the pivot point on said lever, the pivot point on said arm, and the center of rotation of said rotatable member define a substantially equilateral triangle.

19. Apparatus as set out in claim 12 wherein the contacting portion of said hinged arm is curved so as to move said lever substantially equal angular distances for equal changes in speed over the speed range of the governor.

20. Apparatus as set out in claim 12 wherein the contacting portion of said hinged arm is a section of a parabola with the movable end of said arm corresponding to the point substantially directly above one of the focal points of said parabola, whereby said lever is moved by said arm substantially equal angular distances for equal changes in speed over the speed range of the governor.

21. A speed governor as set out in claim 11 wherein the make and break electrical contact is held in normally closed position by means of a spring exerting a substantially constant force over the entire range of speed of said governor.

22. A speed governor as set out in claim 11 wherein the make and break electrical contact is held in normally closed position by means of a spring exerting a substantially constant force over the entire range of speed of said governor and a second spring having a variable force that increases as speed of rotation is increased over the speed range of the governor.

23. Apparatus for controlling a speed by action of a force caused by the speed which is a power function of the speed greater than one, comprising a pivotally mounted force responsive arm, an associated pivotally mounted actuator lever, at least one of the arm and actuator lever curved to provide a series of contacting points progressing from a point near the pivot of the arm to a point near the pivot of the actuator lever, whereby the power effect driving the force responsive arm is offset at least in substantial part.

24. Apparatus for controlling a speed by action of a force caused by the speed which is a power function of the speed greater than one, comprising a pivotally mounted force responsive arm, an associated pivotally mounted actuator lever, at least one of the arm and actuator lever being curved to provide a series of contacting points progressing from a point near the pivot of the arm to a point near the pivot of the actuator lever, and to produce substantially equal angular displacement of the actuator lever for equal changes in speed over a wide range.

25. Apparatus for controlling a speed by action of a force caused by the speed which is a power function of the speed greater than one, comprising an unbalanced force responsive arm, an associated balanced pivotally mounted actuator lever, at least one of the arm and actuator lever being curved to provide a series of contacting points progressing from a point near the pivot of the lever arm to a point near the pivot of the actuator arm, and to produce substantially equal angular displacement of the actuator arm for equal angular displacement of the actuator arm for equal changes in speed over a wide range.

26. Apparatus as set out in claim 25 wherein said series of contacting points between the arm and actuator lever fall adjacent the line petween the pivots of said arm and lever.

27. Apparatus as set out in claim 25 wherein there is provided adjustable means operatively connected with the actuator lever for predetermining the speed at which said apparatus operates.

28. Apparatus for controlling a speed by action of a force caused by the speed which is a power function of the speed greater than one, comprising an unbalanced force responsive arm, an associated balanced actuator lever, at least one of the arm and actuator lever being curved to provide a series of contacting points adjacent the line between the pivots of said arm and lever and progressing from a point near the pivot of the arm to a point near the pivot of the actuator lever, and to produce substantially equal angular displacement of the actuator arm for equal changes in speed over a wide range, and adjustable means connected with the actuator arm for predetermining the speed at which said governor operates.

29. A rotatable member, a centrifugally responsive arm pivoted at one end thereof to said member, and a pivoted balanced actuator lever also mounted on said member and contacted by said arm, at least one of said arm and lever being curved to provide a moving point of contact therebetween during changes in the speed of rotation of said member, said moving point of contact travelling along a line that is at least adjacent the line connecting the pivot points of said arm and lever.

CHARLES H. SPARKLIN.

REFERENCES CITED

The following references are of record in the file of this patent:

UNITED STATES PATENTS

| Number | Name | Date |
|---|---|---|
| 1,221,176 | Herzog | Apr. 3, 1917 |
| 1,979,445 | Bradford | Nov. 6, 1934 |
| 2,152,171 | Avery | Mar. 28, 1939 |
| 2,220,306 | Warner | Nov. 5, 1940 |